US009835274B2

United States Patent
PerMar

(10) Patent No.: US 9,835,274 B2
(45) Date of Patent: Dec. 5, 2017

(54) PIPE ADAPTER DEVICE

(71) Applicant: John W. PerMar, Etowah, TN (US)

(72) Inventor: John W. PerMar, Etowah, TN (US)

(73) Assignee: John W. PerMar, Etowah, TN (US)

(*) Notice: Subject to any disclaimer, the term of this patent is extended or adjusted under 35 U.S.C. 154(b) by 0 days.

(21) Appl. No.: 15/430,628

(22) Filed: Feb. 13, 2017

(65) Prior Publication Data
US 2017/0152971 A1  Jun. 1, 2017

Related U.S. Application Data

(63) Continuation-in-part of application No. 14/519,960, filed on Oct. 21, 2014.

(51) Int. Cl.
F16L 19/07  (2006.01)
F16L 21/025  (2006.01)
E03B 7/09  (2006.01)
F16L 55/16  (2006.01)
F16L 55/163  (2006.01)

(52) U.S. Cl.
CPC ............ F16L 19/07 (2013.01); E03B 7/09 (2013.01); F16L 21/025 (2013.01); F16L 55/163 (2013.01); F16L 55/1608 (2013.01)

(58) Field of Classification Search
CPC ....... F16L 19/07; F16L 21/025; F16L 37/025; F16L 37/05
USPC .......... 285/15, 104–105, 107, 338, 345–346
See application file for complete search history.

(56) References Cited

U.S. PATENT DOCUMENTS

| 578,150 A | 3/1897 | Kerns |
| 1,303,848 A | 5/1919 | Broschart |
| 1,657,488 A | 1/1928 | Shadden |
| 2,241,526 A | 5/1941 | Rosenkranz |
| 2,730,384 A * | 1/1956 | James ................ A47L 15/4217 285/148.13 |
| 2,993,655 A * | 7/1961 | O'Brien ................... B05B 1/12 239/458 |
| 3,048,428 A | 8/1962 | Ransom |
| 3,421,782 A | 1/1969 | Kalish et al. |
| 4,129,324 A | 12/1978 | Jones |
| 4,150,846 A | 4/1979 | Fleischer |
| 4,166,479 A * | 9/1979 | Cleavenger ......... F16L 55/1657 138/89 |

(Continued)

Primary Examiner — Aaron Dunwoody
Assistant Examiner — Fannie Kee
(74) Attorney, Agent, or Firm — Mark Malek; Kelly G. Swartz; Widerman Malek, PL

(57) ABSTRACT

A pipe adapter including an inner tube member, a fastener member, an outer sleeve member, a compressible sleeve member, and a fitting member. The fastener member may have threads on an inner diameter adapted to matingly engage a threaded portion of the inner tube member along a proximal section thereof. The outer sleeve member may girdle the inner tube member and connect to and extend outwardly from the fastener member. The compressible sleeve member may be configured as at least one ring positioned to overlie the outer tube member. The fitting member may connect to a distal section of the inner tube member. At least a portion of at least one of the fitting member and the compressible sleeve member may be positionable within a portion of a pipe. The compressible sleeve member may extend outwardly from a longitudinal axis of the inner tube member toward the pipe.

19 Claims, 15 Drawing Sheets

(56) References Cited

U.S. PATENT DOCUMENTS 5,433,487 A * 7/1995 Kuhn .................. F16L 5/08
                                              285/136.1

* cited by examiner

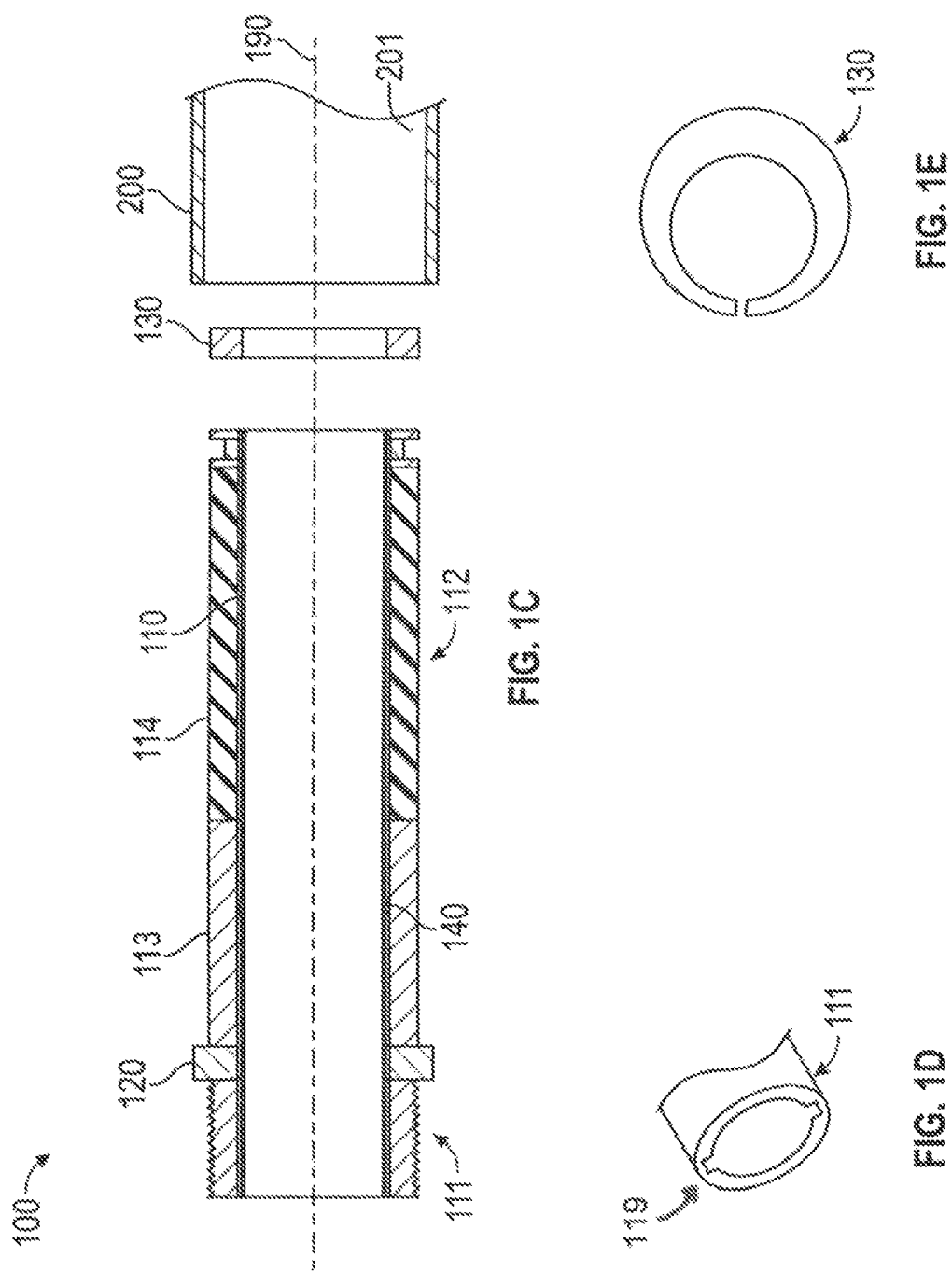

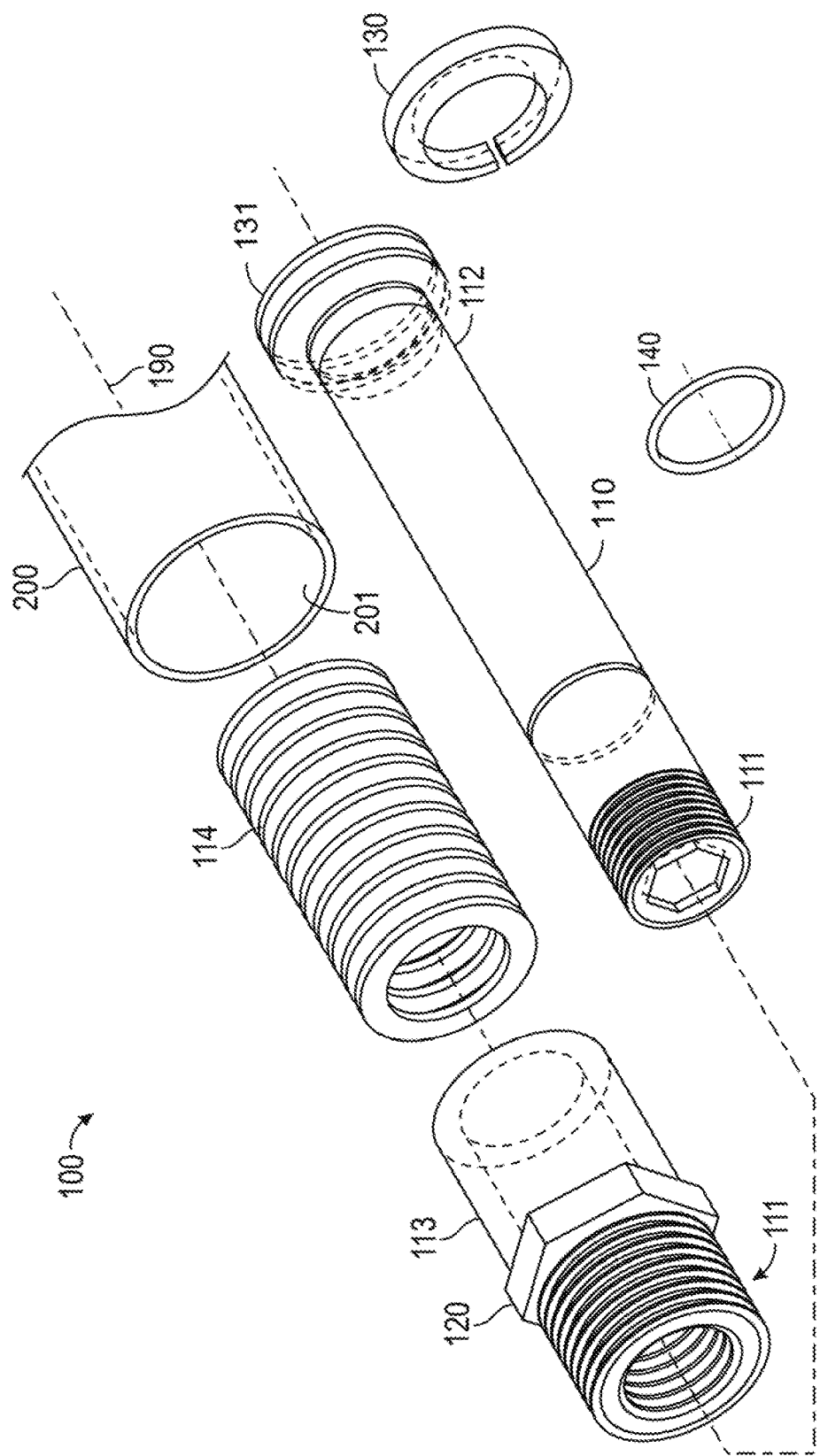

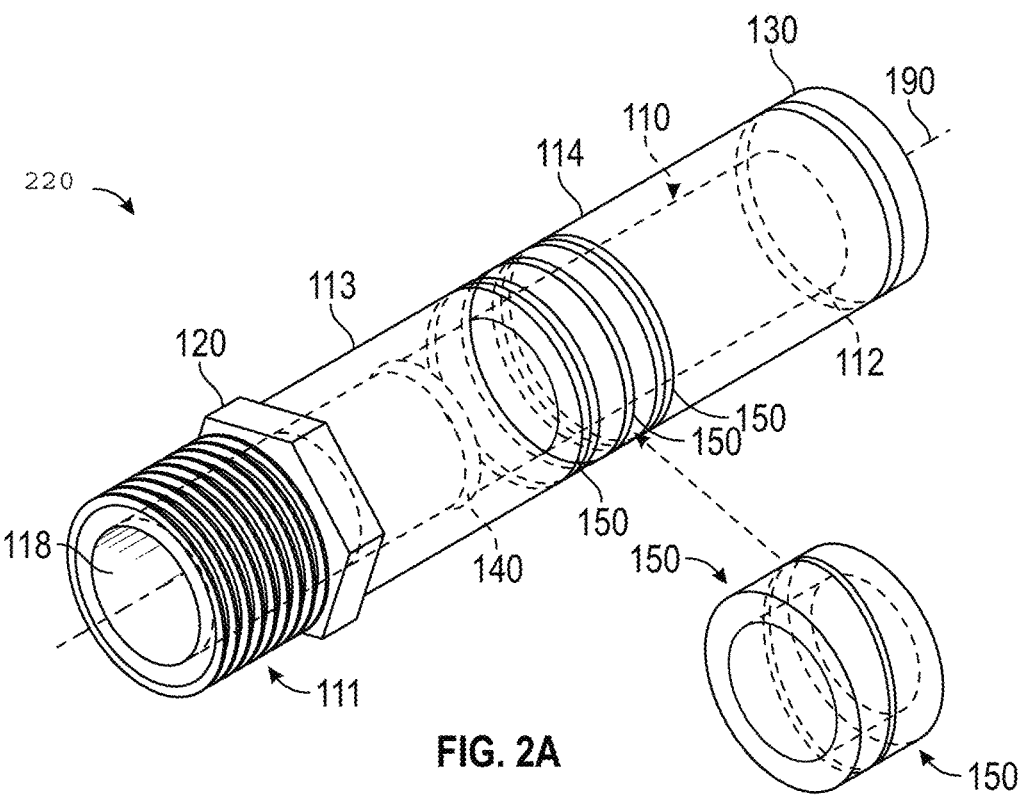
FIG. 2A
FIG. 2B
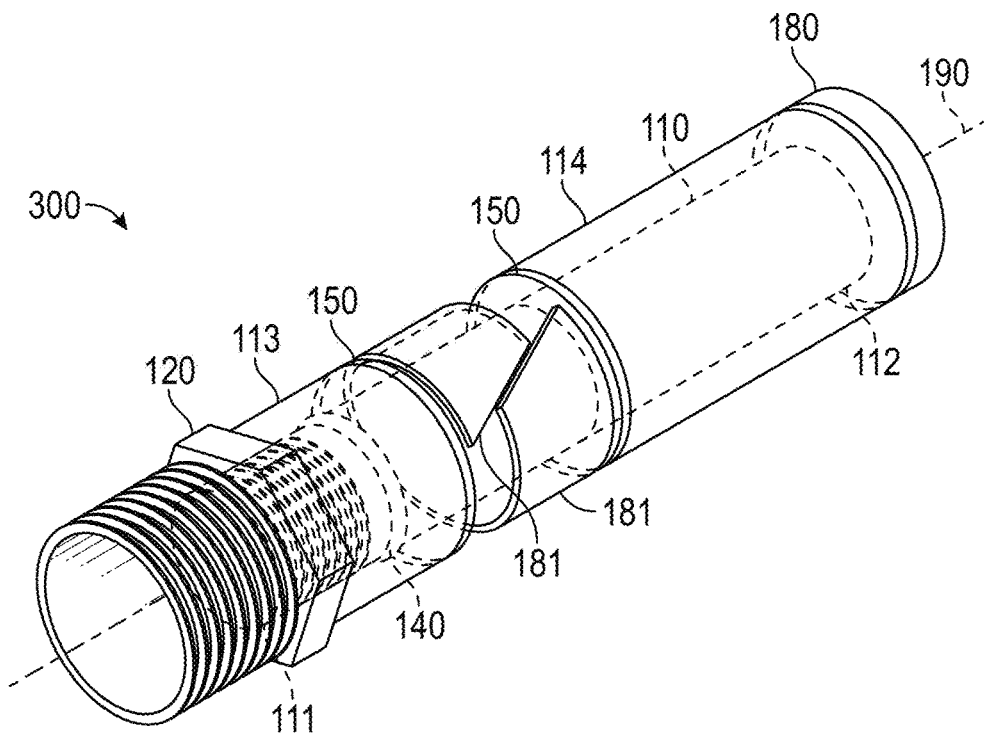
FIG. 3

PIPE ADAPTER DEVICE

RELATED APPLICATIONS

This application is a continuation-in-part and claims the benefit under 35 U.S.C. §120 of U.S. patent application Ser. No. 14/519,960 filed Oct. 21, 2014, the entire content of which is incorporated herein by reference

FIELD OF THE INVENTION

The present invention relates to devices, systems, and methods for pipe adapters, fittings, and connectors, and more specifically, to pipe adapters that allow a broken fitting to be replaced.

BACKGROUND

Pipes and pipe fittings are present in nearly every building. When pipe fittings break, it can often be problematic to fix due in many instances to the fact that space is limited or other objects prevent a replacement part from being used.

When broken fittings cannot be removed, one solution is to cut the pipe and remove the fitting along with a portion of the pipe. Adapters are sometimes used to connect to the remaining pipe, but are generally connected to an exterior portion of the remaining pipe. For instance, a sleeve may be used that fits around the outside portion of the remaining pipe and crimp rings may be used to secure the sleeve. A sleeve may require access to the outside portion of the remaining pipe as well as tool access to the crimp rings. When space is limited, the lack of access can make it difficult, if not impossible, to install such an adapter.

For example, if a sufficient length of pipe does not exist and, more specifically, a length of the outside portion of the pipe available for use, the entire pipe will likely have to be replaced, resulting in higher costs associated with such a repair. Further, if the pipe happens to be protruding through a brick or block wall, for instance, the wall may have to be partially or completely removed to access the pipe, which would also increase the costs of such a repair.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

The present invention provides a pipe adapter including an inner tube member, a fastener member, an outer sleeve member, a compressible sleeve member, and a fitting member.

The inner tube member may have a proximal section with a threaded portion and a distal section.

The fastener member may have threads on an inner diameter adapted to matingly engage the threaded portion of the inner tube member along the proximal section thereof.

The outer sleeve member may girdle the inner tube member and may connect to and extend outwardly from the fastener member.

The compressible sleeve member may be configured as at least one ring positioned to overlie the outer tube member.

The fitting member may connect to the distal section of the inner tube member.

At least a portion of at least one of the fitting member and the compressible sleeve member may be positionable within a portion of a pipe. The compressible sleeve member may extend outwardly from a longitudinal axis of the inner tube member and in a direction toward an inner surface of the pipe.

The fastener member may include a polygonal shaped portion connected to the threaded end.

The first fitting member may include a barbed ring. The first fitting member may include a swivel. Rotating the fastener member may cause the first fitting member to matingly engage the outer sleeve member. Barbs of the first fitting member may expand outwardly from the longitudinal axis and in a direction toward the inner surface of the pipe. The first fitting member may be connected to the distal section of the inner tube member.

The inner tube member may include a grooved section configured to matingly engage an o-ring.

The compressible sleeve member may be configured to create at least one of a liquid-tight or a gas-tight seal with the pipe.

The distal section of the inner tube member may include a grooved member configured to matingly engage the fitting member.

The proximal section of the inner tube member may include an opening that is at least one of polygonal, circular, and oval. The opening may include a slot.

The outer sleeve member may include a recessed portion located between the fastener member and a distal end of the outer sleeve member, wherein the recessed portion may be adapted to carry the compressible sleeve.

A distal end of the outer sleeve member may be adapted to contact the fitting member.

BRIEF DESCRIPTION OF THE DRAWINGS

FIG. 1C is a cross section view of the pipe adapter of FIG. 1A and taken through line 1C-1C.

FIG. 1D is a partial perspective view of a proximal section of the pipe adapter of FIG. 1A.

FIG. 1E is a side elevation view of a fitting member of the pipe adapter of FIG. 1A.

FIG. 1G is a partial exploded perspective view of a pipe adapter according to an embodiment of the present invention being connected to a pipe.

FIG. 2A is a perspective view of a pipe adapter according to another embodiment of the present invention.

FIG. 2B is a perspective view of two washers that may be used in connection with the pipe adapter of FIG. 2A.

FIG. 3 is a perspective view of a pipe adapter according to yet another embodiment of the present invention.

DETAILED DESCRIPTION OF THE INVENTION

Figure 1A:
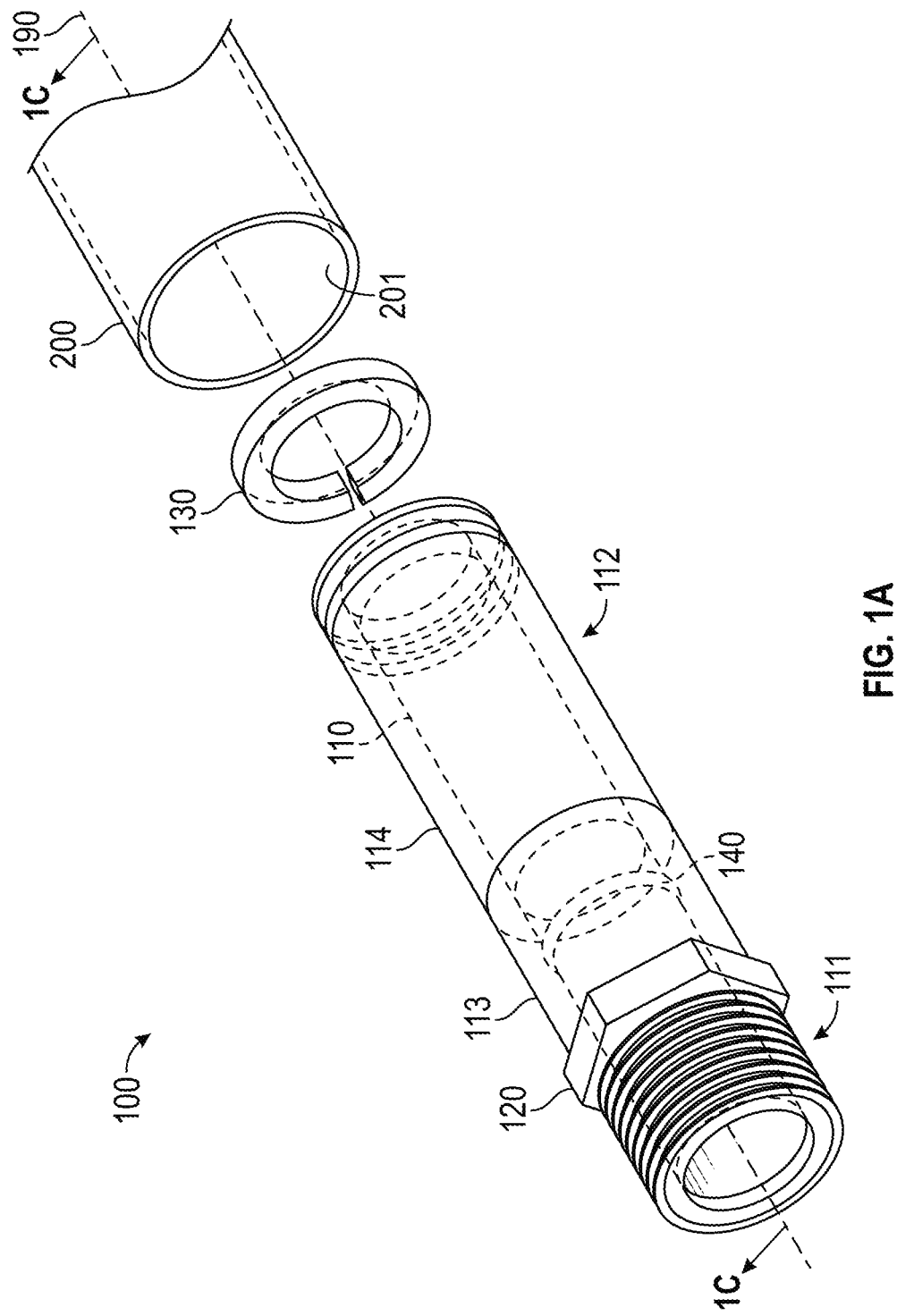
FIG. 1A is an exploded partial perspective view of a pipe adapter according to an embodiment of the present invention being connected to a pipe.
Figure 1B:
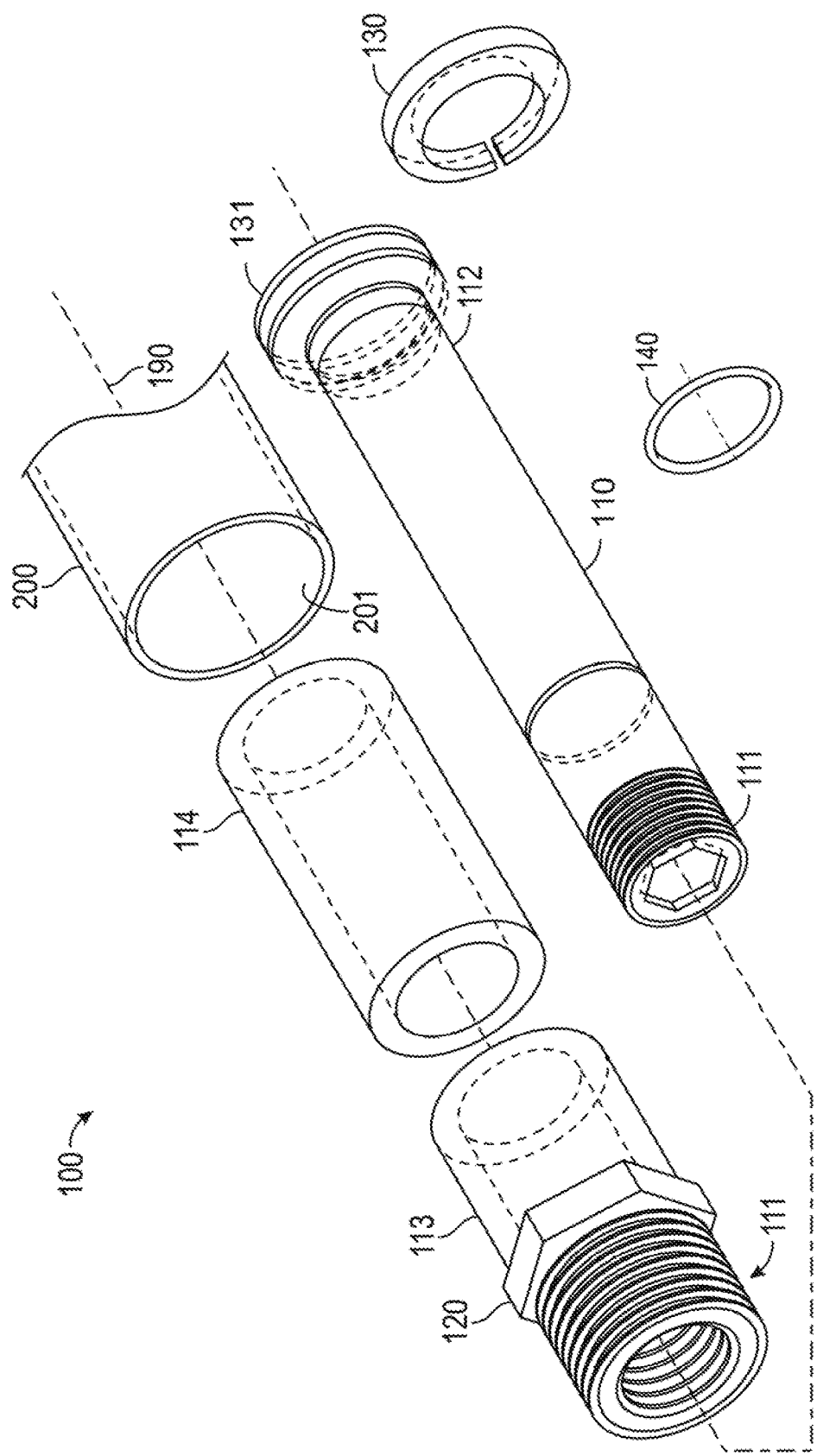
FIG. 1B is a partial exploded perspective view of the pipe adapter of FIG. 1A being connected to a pipe.
Figure 1F:
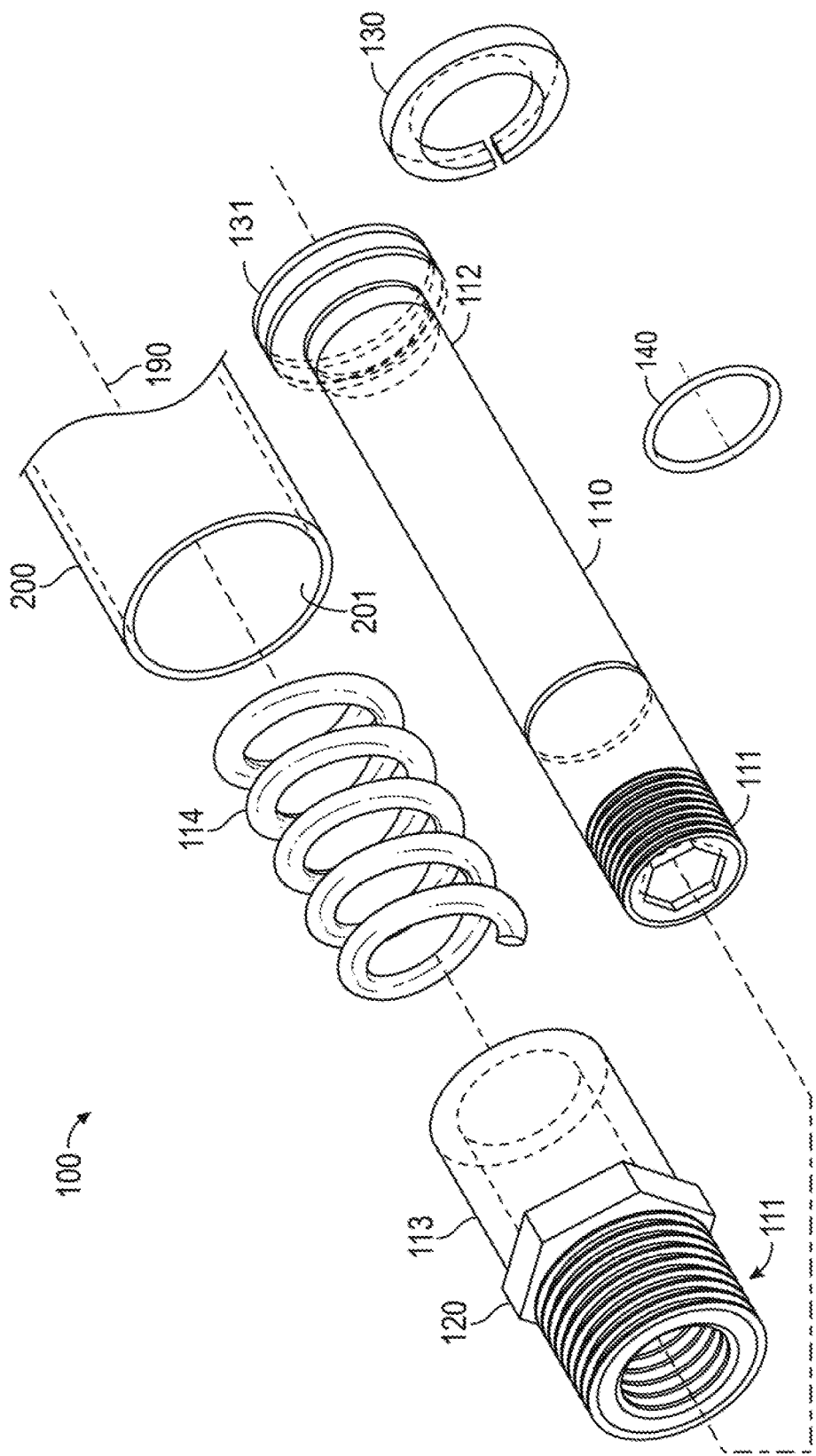
FIG. 1F is a partial exploded perspective view of a pipe adapter according to an embodiment of the present invention being connected to a pipe.
Figure 1H:
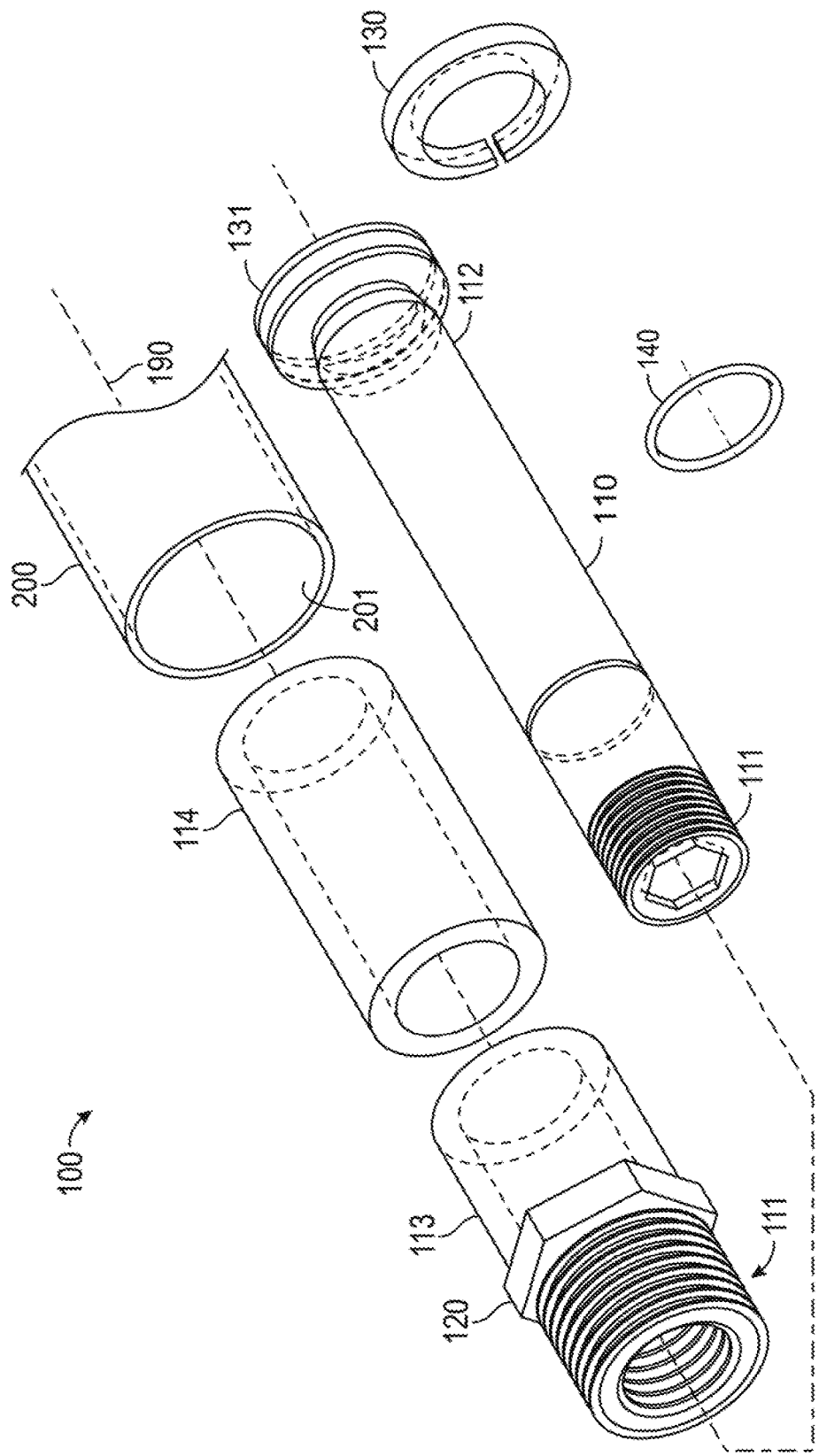
FIG. 1H is a partial exploded perspective view of a pipe adapter according to an embodiment of the present invention being connected to a pipe.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1A-1C and 10, an embodiment of the invention, as shown and described by the various figures and accompanying text, provides a pipe adapter 100 (the pipe adapter is referenced as 199 in FIG. 10) which may include an inner tube member 110, a fastener member 120, an outer sleeve member 113, a compressible sleeve member 114, and a fitting member 130. The inner tube member 110 may have a proximal section 111 and a distal section 112. The proximal section 111 may be generally one end of the inner tube member 110. The distal section 112 may be generally the opposite end of the inner tube member 110. More specifically, and without limitation, the proximal section 111 may include a portion of the inner tube member 110, the outer sleeve member 113, and/or the fastener member 120, and the distal section 112 may include a portion of the inner tube member 110, the compressible sleeve member 114, and/or the fitting member 130.

In another example, and without limitation, the proximal section 111 may include a portion of the inner tube member 110 and/or the fastener member 120 and the distal section 112 may include a portion of the inner tube member 110, the outer sleeve member 113, the compressible sleeve member 114, and/or the fitting member 130.

Figure 12:
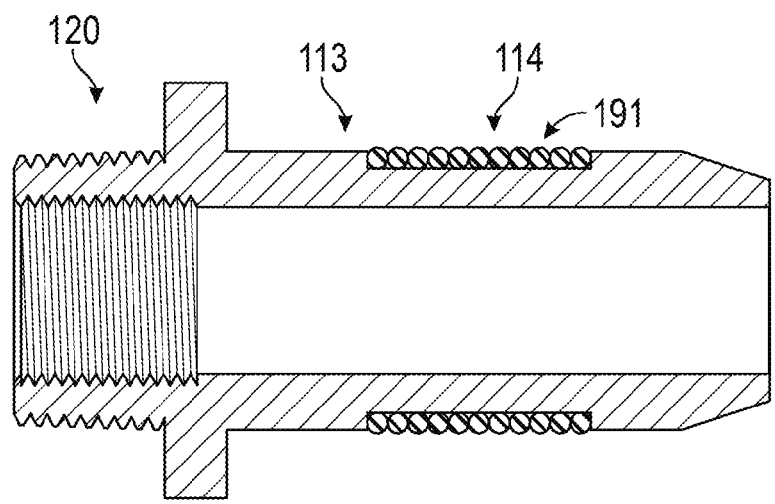
FIG. 12 is a cross-sectional view of the outer sleeve member taken through the 12-12 line of FIG. 11.

The fastener member 120 may be connected to the inner tube member 110 along the proximal section 111 thereof. The outer sleeve member 113 may girdle the inner tube member 110 and may be connected to and may extend outwardly from the fastener member 120. The compressible sleeve member 114 may be connected to and may extend outwardly from the outer sleeve member 113 and may be positioned to overlie the inner tube member 110. As shown in FIG. 12, the outer sleeve member 113 may include a recessed portion 191 located between the fastener member 120 and a distal section 112 of the outer sleeve member 113. The recessed portion 191 may be adapted to carry the compressible sleeve member 114. The recessed portion 191 may have a width equal to the compressible sleeve member 114 width. The recessed portion 191 may have a depth slightly less than the height of a cross-section of the compressible sleeve member 114. The recessed portion 191 may be adapted to carry the compressible sleeve member 114 and position the compressible sleeve member 114 to extend slightly beyond an outer surface of the outer sleeve member 113. The position of the compressible sleeve member 114 when carried by the recessed portion 191 may be adapted to form an air or fluid tight seal with the pipe when the compressible sleeve member 114, or any portion thereof, is positioned within a pipe.

The fitting member 130 may be connected to the distal section 112 of the inner tube member 110 and may be in communication with the compressible sleeve member 114. As perhaps best illustrated in FIG. 1E, the fitting member 130 may be a lock ring, may be cam shaped, and may further include an opening. The fitting member 130 may be a cam lock washer, a flat washer, a c-clip, and/or a beveled washer. Those skilled in the art will appreciate that the fitting member 130 may also be provided by any other device suitable for matingly engaging the compressible sleeve member 114. The fitting member 130 may matingly engage with a grooved member 131. The grooved member 131 may be attached to a portion of the inner tube member 110 and/or the compressible sleeve member 114. The distal section 112 of the inner tube member 110 may include the grooved member 131. Those skilled in the art will appreciate that any type of fitting may be used as the fitting member 130 as desired. The fastener member 130 may girdle at least one of the inner tube member 110, the outer sleeve member 113, and/or the compressible sleeve member 114.

Figure 10:
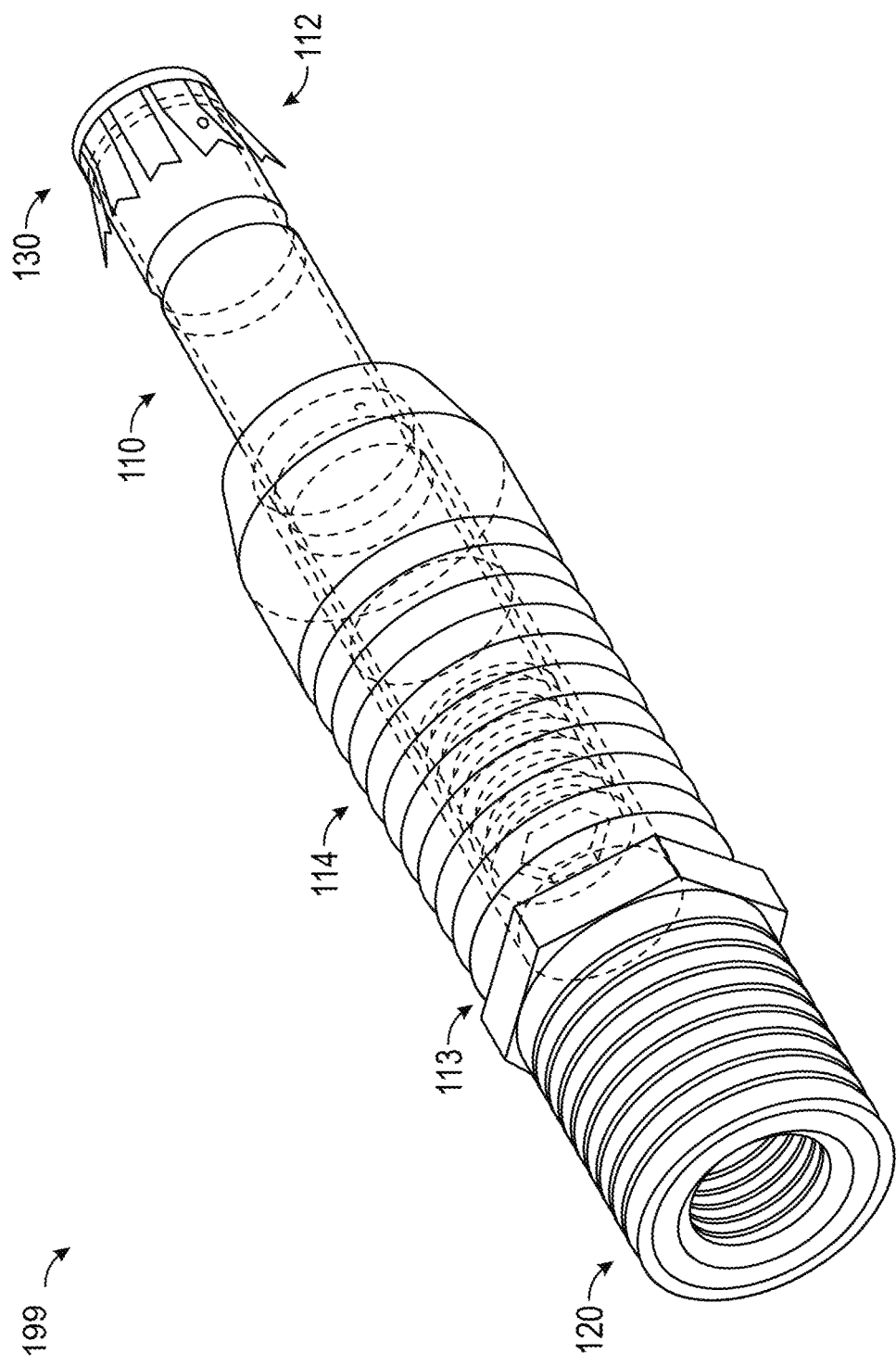
FIG. 10 is a side perspective view of a pipe adapter according to an embodiment of the present invention.
Figure 11:
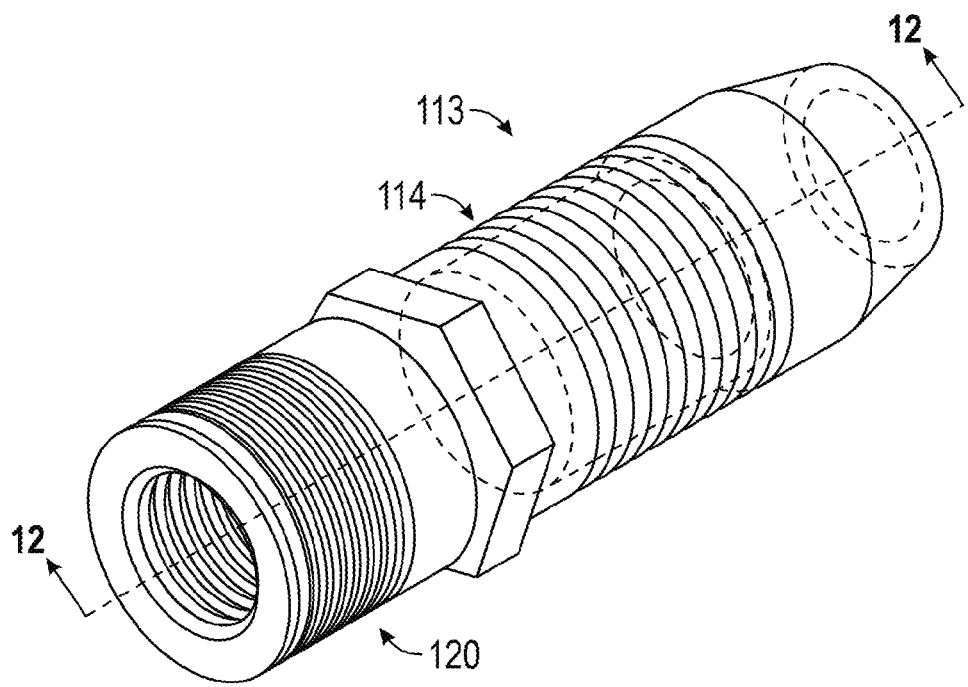
FIG. 11 is a side perspective view of the outer sleeve member of the pipe adapter according to an embodiment of the present invention.
Figure 13:
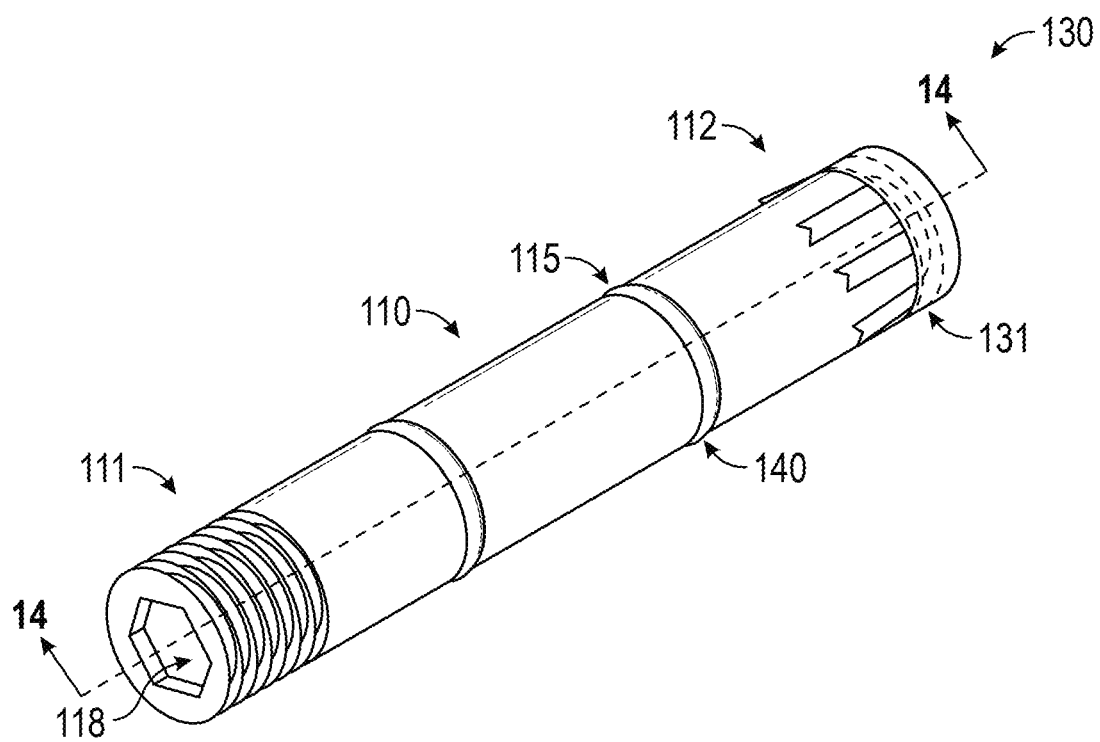
FIG. 13 is a side perspective view of the inner tube member of the pipe adapter depicted in FIG. 10.
Figure 14:
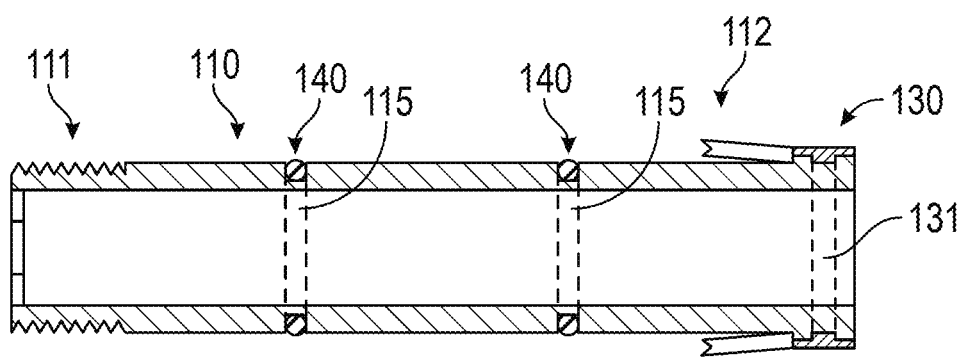
FIG. 14 is a cross-sectional view of the inner tube member taken through the 14-14 line of FIG. 13.

As depicted at least in FIGS. 10, 13, and 14, the fitting member 130 may include a barbed ring swivel fitting. Rotating the fastener member 120 may cause the fitting member 130 to matingly engage the outer sleeve member 113. The fitting member 130 may have barbs located around and secured at one end to a ring. The free end of each barb may extend away from the distal section of the inner tube member 110 toward the proximal section 111 of the inner tube member 110. The barb of the fitting member 130 may be adapted to expand outwardly from the longitudinal axis of the pipe adapter 199 and in a direction toward the inner surface of the pipe when the fastener member 120 is rotated in a direction causing the fastener member 120 to move toward the distal section 112 of the inner tube member 110.

At least a portion of one or each of the inner tube member 110, the outer sleeve member 113, the compressible sleeve member 114, the fastener member 120, and/or the fitting member 130 may be positionable within a portion of a pipe 200. Rotating the fastener member 120 may cause the compressible sleeve member 114 to be compressed and at least a portion of exterior walls thereof to expand outwardly from a longitudinal axis 190 of the inner tube member 110 and in a direction toward an inner surface 201 of the pipe 200.

The fastener member 120 may have an end that is threaded. The fastener member 120 may include a polygonal shaped portion connected to the threaded end. For example, and without limitation, the fastener member 120 may be threaded on at least a portion of the outer diameter and/or on at least a portion of the internal diameter and at least a portion of the outer diameter may be polygonal shaped. As another example, and without limitation, the fastener member 120 may be threaded on generally half of the outer diameter and on generally half of the internal diameter and the remaining generally half of the outer diameter may be polygonal shaped. For example, and without limitation, the fastener member 120 may include threading on the external diameter which may matingly engage with a hose bib, bibcock fitting, or other fitting as desired. Those skilled in the art will appreciate that the fastener member 120 may be any type of adapter, or more specifically pipe adapter fastener or pipe fastener, as desired.

The inner tube member 110 may have an opening 118 that is circular and/or polygonal shaped. The opening 118 may be polygonal, circular, oval, generally polygonal, generally circular, and/or generally oval. For example, and without limitation, the opening 118 may be hexagonal shaped so that a device can be used to rotate the inner tube member 110. In addition, a slot 119 or a plurality of slots 119 may be included in the opening 118 as illustrated in FIG. 1D.

The compressible sleeve member 114 may be flexible, compressible, stretchable, and/or expandable. For example, and without limitation, the compressible sleeve member 114 may be a single piece of cylindrical rubber. Additionally, the compressible sleeve member 114 may be a helical strand of rubber or numerous pieces of rubber, such as a plurality of O-rings. Those skilled in the art will appreciate that the compressible sleeve member 114 may be provided by numerous configurations and materials as desired.

The pipe adapter 100, 199 may further include an O-ring 140 which may be positioned between the inner tube member 110 and an interior wall of the outer sleeve member 113. The inner tube member 110 may comprise a grooved section 115 which may be configured to matingly receive the O-ring 140.

An end of the inner tube member 110 may be tapered and/or threaded. For example, and without limitation, the inner tube member 110 may be threaded on the outer diameter and/or on the inner diameter. The inner tube member 110 may matingly engage with the fastener member 120. More specifically, threads on the outer diameter of the inner tube member may matingly engage with threads on the inner diameter of the fastener member 120. Outward expansion of the compressible sleeve member 114 may be configured to create a solid-tight, a liquid-tight, a plasma-tight, and/or a gas-tight seal with the pipe 200. The compressible sleeve member 114 may be configured in a series of rings, a helical configuration, and/or a single piece of material.

The pipe adapter 100, 199 may be used for all or nearly all types of pipe and pipe fittings applications. For example, and without limitation, the pipe adapter 100, 199 may be used in the plumbing industry, gas industry, hydraulic industry, residential settings, or in any other commercial setting. For instance, the pipe adapter 100, 199 may be used in any application involving any pipe, fitting, or pipe-like object which may conveyor is intended to convey liquid, gas, plasma, and/or a solid.

Those skilled in the art will appreciate that the pipe adapter 100, 199 and various components thereof may be any size, i.e., length, diameter, thickness, etc. as desired. Those skilled in the art will also appreciate that the pipe adapter 100, 199 and various components thereof may be any material, i.e., rubber, metal, metal alloy, plastic, polyvinyl chloride (PVC), chlorinated polyvinyl chloride (CPVC), acrylonitrile butadiene styrene (ABS), high-density polyethylene (HDPE), crosslinked polyethylene, clay, etc. as desired. Additionally, each component of the pipe adapter 100, 199 may be separate, integrally formed or molded, or any combination thereof.

Referring now additionally to FIG. 2A, another embodiment of the pipe adapter 220 according to the present invention is now disclosed in greater detail. More specifically, the pipe adapter 220 may further include a washer 150. The washer 150 may be a plurality of washers 150. The washer 150 may girdle the inner tube member 110, the outer sleeve member 113, and/or the compressible sleeve member 114. Those skilled in the art will appreciate that the washer 150 may be any type of washer, including, but not limited to, a flat washer, a cam lock washer, a beveled locking washer, a locking washer, and/or a beveled washer. For example, and without limitation, as illustrated in FIG. 2A, three washers 150 may be used as flat washers and two additional washers 150 may be used that are beveled washers. As illustrated in FIG. 2B, in place of one or more of the five washers 150 illustrated in FIG. 2A, two washers 150 that are beveled washers may be used. Those skilled in the art will appreciate that any combination and any number of washers 150 may be used as desired.

Referring now additionally to FIG. 3, another embodiment of the pipe adapter 300 according to the present invention is now described in greater detail. More specifically, and with reference to the fitting member 130, the fitting member 130 may include a first fitting member 180 and a second fitting member 181. The first fitting member 180 may be a flange. The first fitting member 180 may be connected to the inner tube member 110, such as at the distal section 112, and may be in communication with the compressible sleeve member 114.

For example, and without limitation, the first fitting member 180 may provide resistance to the compressible sleeve member 114 when the compressible sleeve member 114 is compressed, thereby forcing the compressible sleeve member 114 to expand outward from the longitudinal axis 190 toward the inner surface 201 of the pipe 200.

The second fitting member 181 may be a lock sleeve. As illustrated, two second fitting members 181 may be included in the pipe adapter 300. When compressed toward each other, the two second fitting members 181 may move outwardly from the longitudinal axis 190 toward the inner surface 201 of the pipe 200. As further illustrated, the pipe adapter 300 may include a washer 150 located adjacent to one of the two second fitting members 181 on each side of the second fitting members 181. Those skilled in the art will appreciate that any combination and any number of first fitting members 180, second fitting members 181 and washers 150 may be used as desired.

When the second fitting member 181 is a lock sleeve, the second fitting member 181 may be a non-continuous ring that may have an angled slit through it and which may allow for compression thereof so that as the second fitting member 181 is compressed, the diameter of the second fitting member 181 increases. As the diameter of the second fitting member 181 increases, the exterior walls of the second fitting member 181 may expand outwardly from the longitudinal axis 190 and in a direction toward the inner surface 201 of the pipe 200. The second fitting member 181 may also be two half fittings which may communicate as described herein. The second fitting member 181 may include a first portion or a first half that is attached to the outer sleeve member 113 and a second portion or a second half that is attached to the compressible sleeve member 114.

For example, and without limitation, the second fitting member 181 may be a lock sleeve and rotation of the fastening member 120 may cause the second fitting member 181 to be compressed so that exterior walls of the second fitting member 181 may expand outwardly from the longitudinal axis 190 and in a direction toward the inner surface 201 of the pipe 200. At least a portion of the first fitting member 180, the second fitting member 181, and/or the compressible sleeve member 114 may be positionable within a portion of the pipe 200.

Figure 4:
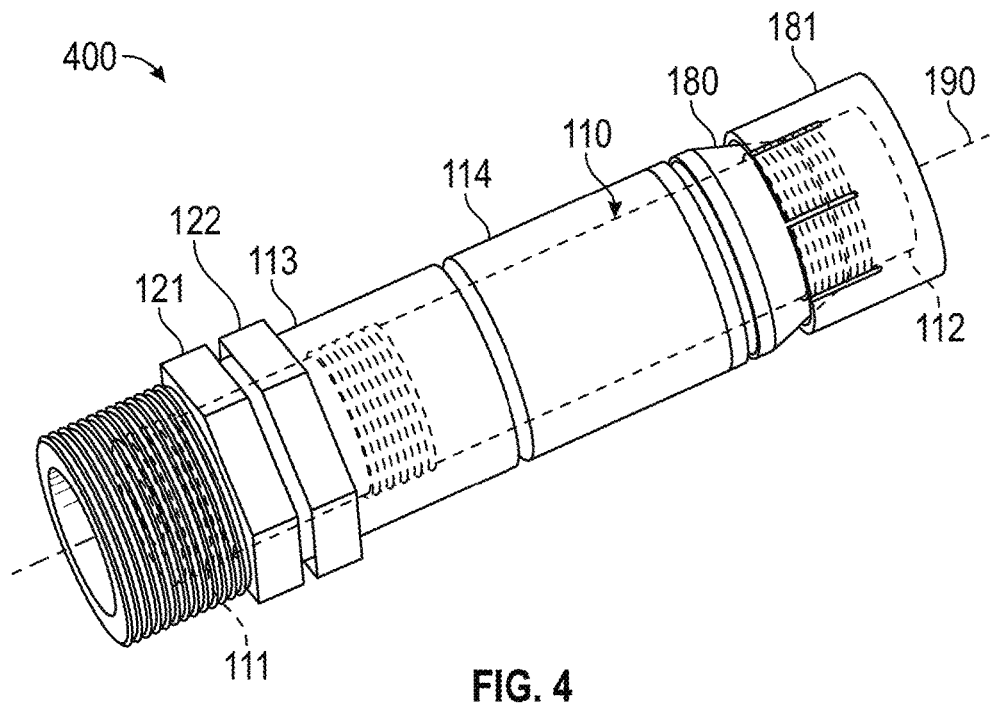
FIG. 4 is a perspective view of a pipe adapter according to still another embodiment of the present invention.

Referring now additionally to FIG. 4, another embodiment of the pipe adapter 400 according to the present invention is now disclosed in greater detail. More specifically, and with reference to the first fitting member 180 and the second fitting member 181, the first fitting member 180 may be a nose cone connected to the distal section 112 of the inner tube member 110 and the second fitting member 181 may be a lock sleeve which may be configured to matingly engage at least a portion of the nose cone. When the first fitting member 180 is matingly engaged with the second fitting member 181, the first fitting member 180 may expand outwardly from the longitudinal axis 190 toward the inner surface 201 of the pipe 200. As a result of the first fitting member 180 expanding, the first fitting member 180 may communicate with the inner surface 201 of the pipe 200 thus preventing or hindering the pipe adapter 400 from being removed from the pipe 200 once installed.

In addition, the fastener member 120 may include a first fastener member 121 and a second fastener member 122. The first fastener member 121 and the second fastener member 122 may include a threaded portion which may extend outwardly from the first fastener member 121 and/or the second fastener member 122 along the longitudinal axis 190. More specifically, the threaded portion extends along the longitudinal axis 190, but is oriented normal to the longitudinal axis 190. The threaded portion of the first fastener member 121 and the second fastener member 122 may include threading on the external diameter and internal diameter. The threading on the external diameter may matingly engage with a hose bib, bibcock fitting, or other fitting as desired. Those skilled in the art will appreciate that the first and second fastener member 121, 122 may be any type of adapter, or more specifically pipe adapter fastener or pipe fastener, as desired. The threading on the internal diameter may matingly (threadably) engage the inner tube member 110 or other fitting as desired. Those skilled in the art will appreciate that the first fastener member 121 and the second fastener member 122 may also connect to the inner tube member 110 by any means such as glue, adhesive, fastener, screw, bolt, welding, or any other means understood by those having the benefit of this disclosure.

Rotating the first fastener member 121 may cause the first fitting member 180 to further matingly engage the second fitting member 181. Exterior walls of the second fitting member 181 may expand outwardly from the longitudinal axis 190 and in a direction toward the inner surface 201 of the pipe 200. Rotating the second fastener member 122 may cause the compressible sleeve member 114 to be compressed and at least a portion of exterior walls thereof to expand outwardly from the longitudinal axis 190 of the inner tube member 110 and in a direction toward the inner surface 201 of the pipe 200. The first fastener member 121 may be connected to the inner tube member 110 along the proximal section 111 thereof. The outer sleeve member 113 may be connected to and may extend outwardly from the first fastener member 121 or the second fastener member 122. Those skilled in the art will appreciate that any number of fastener members 120 may be used. Those skilled in the art will also appreciate that a portion of the first fastener member 121 and/or a portion of the second fastener member 122 may include a polygonal feature to matingly engage with various tools which may further allow rotation of the first fastener member 121 and/or the second fastener member 122 together.

For example, and without limitation, the polygonal feature of the first fastener member 121 and the second fastener member 122 may be hexagonal shaped so that a wrench may matingly engage with each separately or jointly, thus allowing a user to turn the first fastener member 121 or the second fastener member 122 while not turning the other. A user may also be able to turn both the first fastener member 121 and the second fastener member 122.

Figure 5:
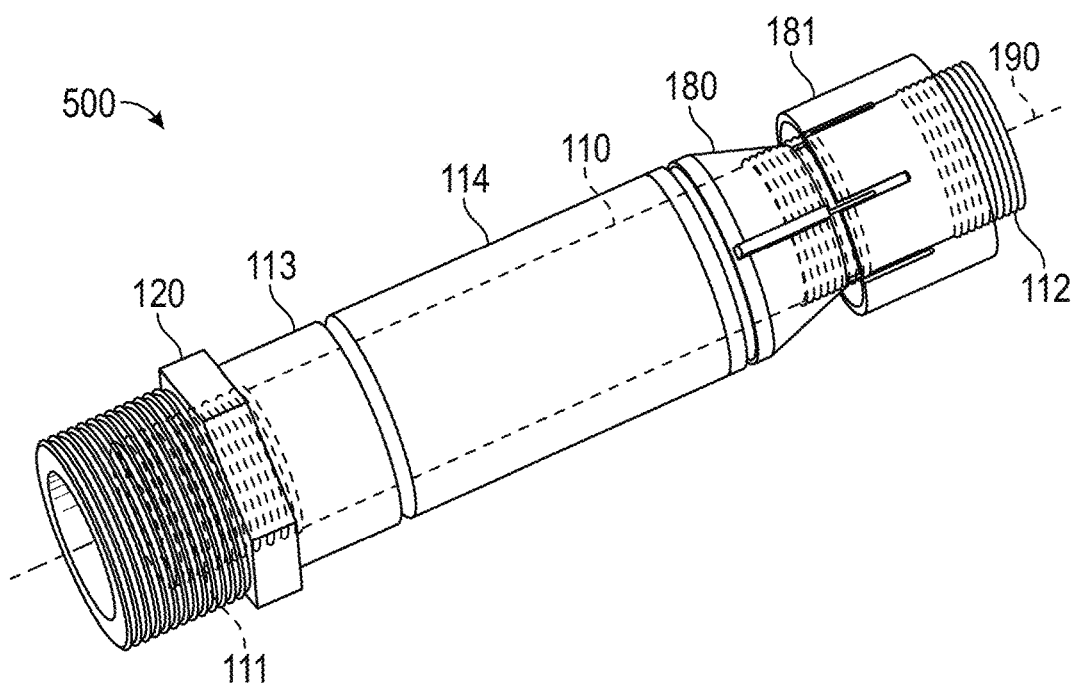
FIG. 5 is a perspective view of a pipe adapter according to another embodiment of the present invention.

Referring now additionally to FIG. 5, another embodiment of the pipe adapter 500 according to the present invention is now disclosed in greater detail. More specifically, and with reference to the distal section 112 of the inner tube member 110, the distal section 112 may include a portion that is reverse threaded. In addition to the portion that is reverse threaded, the distal section 112 may also include a portion that is threaded in the standard direction.

For example, and without limitation, the portion that is reverse threaded may allow the compressible sleeve member 114, the first fitting member 180, and/or the second fitting member 181 to matingly (or threadably) engage with the inner tube member 110. The second fitting member 181 or another device or fitting may matingly (or threadably) engage the portion that is threaded in the standard direction.

As another example, and without limitation, the portion that is reverse threaded may allow the second fitting member 181 or another device or fitting to matingly (or threadably) engage the inner tube member 110. The compressible sleeve member 114, the first fitting member 180, and/or the second fitting member 181 may matingly engage the portion that is reverse threaded. This may prevent or hinder components of the pipe adapter 500, including, but not limited to, the compressible sleeve member 114, the first fitting member 180, and/or the second fitting member 181 from disengaging from the pipe adapter 500.

Figure 6A:
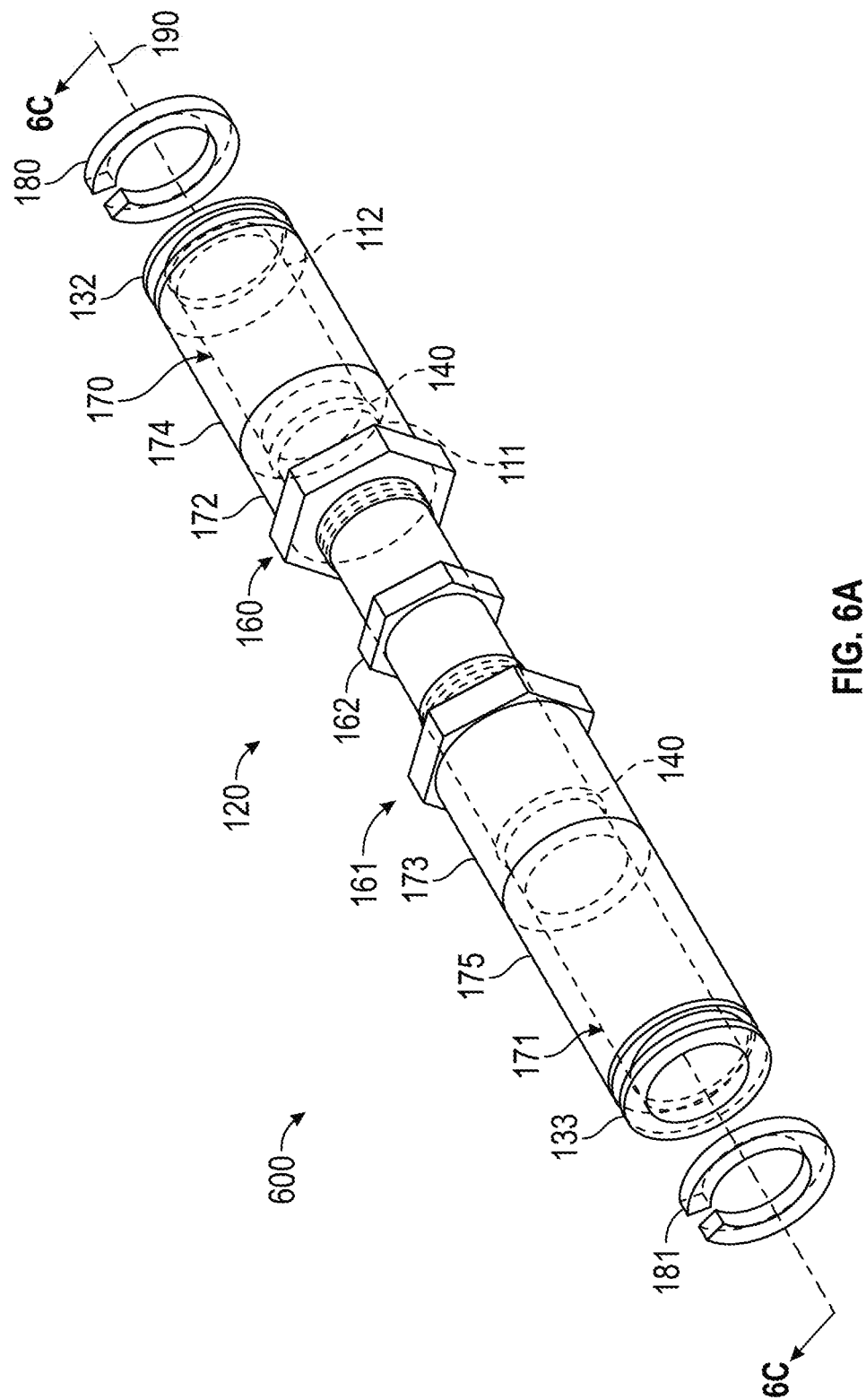
FIG. 6A is a partially exploded perspective view of a pipe adapter according to yet another embodiment of the present invention.
Figure 6B:
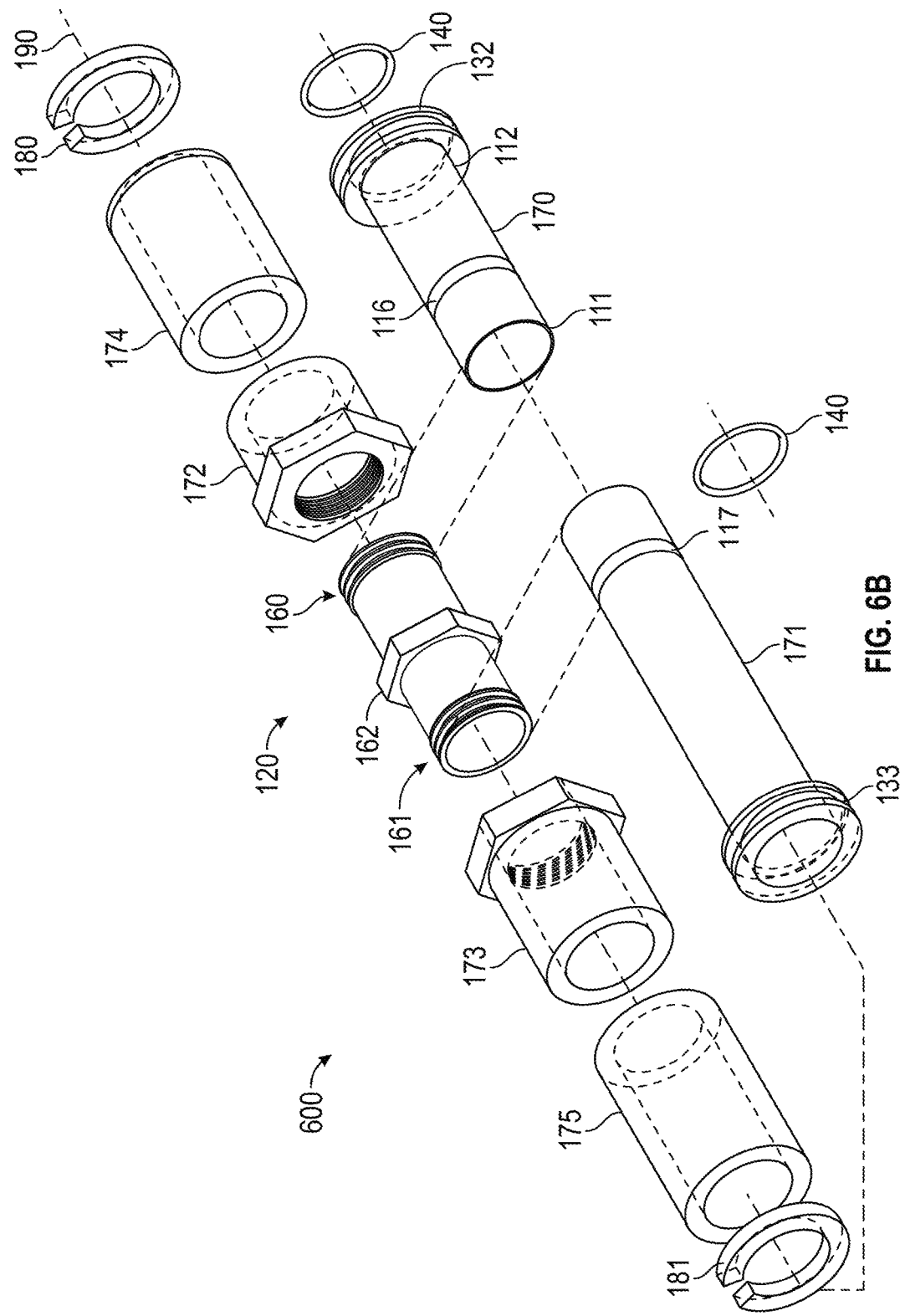
FIG. 6B is an exploded perspective view of the pipe adapter of FIG. 6A.
Figure 6C:
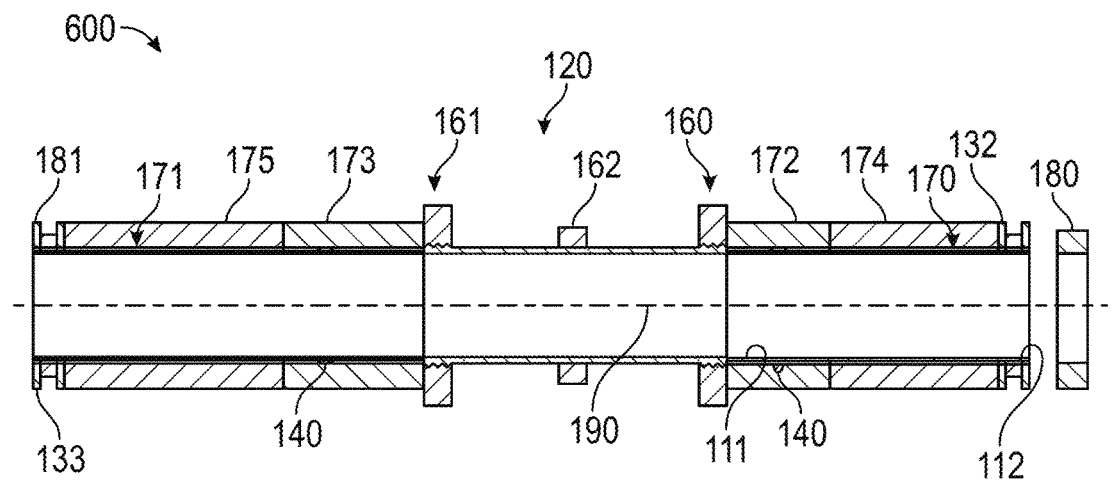
FIG. 6C is a cross section view of the pipe adapter of FIG. 6A and taken through line 6C-6C.

Referring now additionally to FIGS. 6A-6C, another embodiment of the pipe adapter 600 according to the present invention is now disclosed in greater detail. More specifically, and with reference to the first fitting member 180 and the second fitting member 181, the first fitting member 180 and/or the second fitting member 181 are depicted as washers. However, either fitting member may be a nose cone, as depicted in FIGS. 4 and 5, and one or both may be configured to matingly engage at least a portion of a lock sleeve.

The fastener member 120 may have a first end 160, a second end 161, and a medial section 162. The inner tube member 110 may include a first inner tube member 170 and a second inner tube member 171. The first inner tube member 170 may be connected to and may extend outwardly from the first end 160 of the fastener member 120. The first inner tube member 170 may have a proximal section 111 and a distal section 112. The second inner tube member 171 may be connected to and may extend outwardly from the second end 161 of the fastener member 120. The outer sleeve member 113 may include a first outer sleeve member 172 which may girdle the first inner tube member 170 and may be connected to and may extend outwardly from the first end 160 of the fastener member 120. The outer sleeve member 113 may also include a second outer sleeve member 173 that may girdle the second inner tube member 171 and may be connected to and may extend outwardly from the second end 161 of the fastener member 120.

The compressible sleeve member 114 may include a first and second compressible sleeve member 174, 175. The first compressible sleeve member 174 may be connected to and may extend outwardly from the first outer sleeve member 172 and may be positioned to overlie the first inner tube member 170. The second compressible sleeve member 175 may be connected to and may extend outwardly from the second outer sleeve member 173 and may be positioned to overlie the second inner tube member 171. The fitting member 130 may include a first fitting member 180 which may be adapted to be connected to the first inner tube member 170 and may be in communication with the first compressible sleeve member 174. The first fitting member 180 may also be adapted to be connected to the distal section 112 of the first inner tube member 170. The fitting member 130 may also include a second fitting member 181 which may be adapted to be connected to the second inner tube member 171 and may be in communication with the second compressible sleeve member 175.

At least a portion of the first fitting member 180 and/or the first compressible sleeve member 174 may be positionable within a portion of a first pipe. At least a portion of the second fitting member 181 and/or the second compressible sleeve member 175 may be positionable within a portion of a second pipe. Rotating the first end 160 and/or the second end 161 may cause at least a portion of exterior walls of the first compressible sleeve member 172 and/or the second compressible sleeve member 173 to expand outwardly from a longitudinal axis 190 of the respective first and second inner tube members 170, 171 in a direction toward an inner surface of the respective first and second pipes.

Rotating the first end 160, the second end 161, the medial section 162, the first outer sleeve member 172, and/or the second outer sleeve member 173 may cause the first compressible sleeve member 174 and/or the second compressible sleeve member 175 to be compressed and at least a portion of exterior walls thereof to expand outwardly from the longitudinal axis 190 of the respective first and second inner tube members 170, 171 and in a direction toward an inner surface of the respective first and second pipes.

The O-ring 140 or a plurality of O-rings 140 may girdle the first inner tube member 170 and/or the second inner tube member 171. The inner tube member 110, the first inner tube member 170, and/or the second inner tube member 171 may include a first and second grooved section 116, 117. The O-ring 140 or plurality of O-rings 140 may matingly engage the first grooved section 116 and/or the second grooved section 117.

As illustrated, a portion of the first end 160 may be threaded and may matingly engage with a portion of the first outer sleeve member 172. The first end 160 and at least the portion of the first outer sleeve member 172 may be integrally attached and/or molded. Alternatively, the proximal section 111 and/or the first inner tube member 170 may be integrally attached and/or molded to the first end 160 and/or the fastener member 120. Those skilled in the art will appreciate that the proximal section 111, the fastener member 120, the first inner tube member 170, and/or the first end 160 may be attached by any means including, but not limited to, glue, adhesive, fastener, screw, bolt, welding, or any other means understood by those having the benefit of this disclosure.

As illustrated, a portion of the second end 161 may be threaded and may matingly engage with a portion of the second outer sleeve member 173. The second end 161 and at least the portion of the second outer sleeve member 173 may be integrally attached and/or molded. Alternatively, the second inner tube member 171 may be integrally attached and/or molded to the second end 161 and/or the fastener member 120. Those skilled in the art will appreciate that the fastener member 120, the second inner tube member 171, and/or the second end 161 may be attached by any means including, but not limited to, glue, adhesive, fastener, screw, bolt, welding, or any other means understood by those having the benefit of this disclosure.

The first and second inner tube member 170, 171 and the fastener member 120 may be one tube which may include threaded portions, may be smooth, and/or may include grooves. As illustrated, the first and second inner tube member 170, 171 may include portions which may matingly engage the first and second fitting member 180, 181, respectively.

The grooved member 131 may include a first and second grooved member 132, 133. The first fitting member 180 may matingly engage the first grooved member 132. The second fitting member 181 may matingly engage the second grooved member 133. The first grooved member 132 may be attached to or a portion of the first inner tube member 170 and/or the first compressible sleeve member 174. The distal section 112 of the first inner tube member 170 may include the first grooved member 132. The second grooved member 133 may be attached to or a portion of the second inner tube member 171 and/or the second compressible sleeve member 175.

Figure 7:
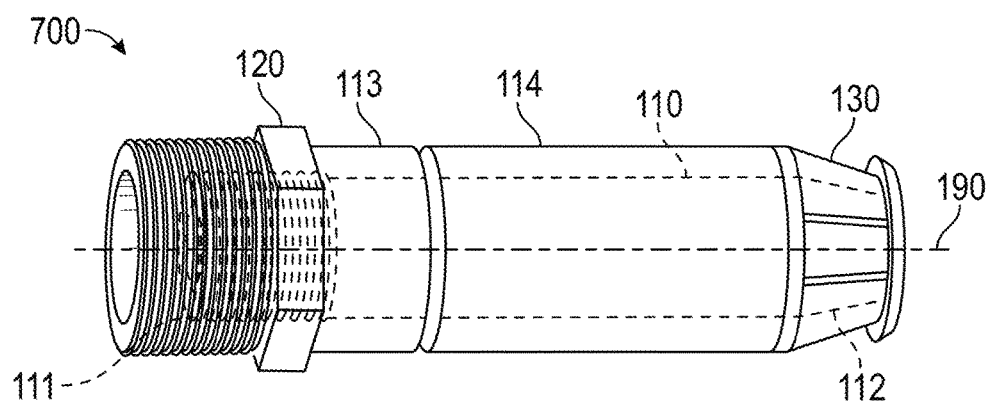
FIG. 7 is a perspective view of a pipe adapter according to still another embodiment of the present invention.
Figure 8:
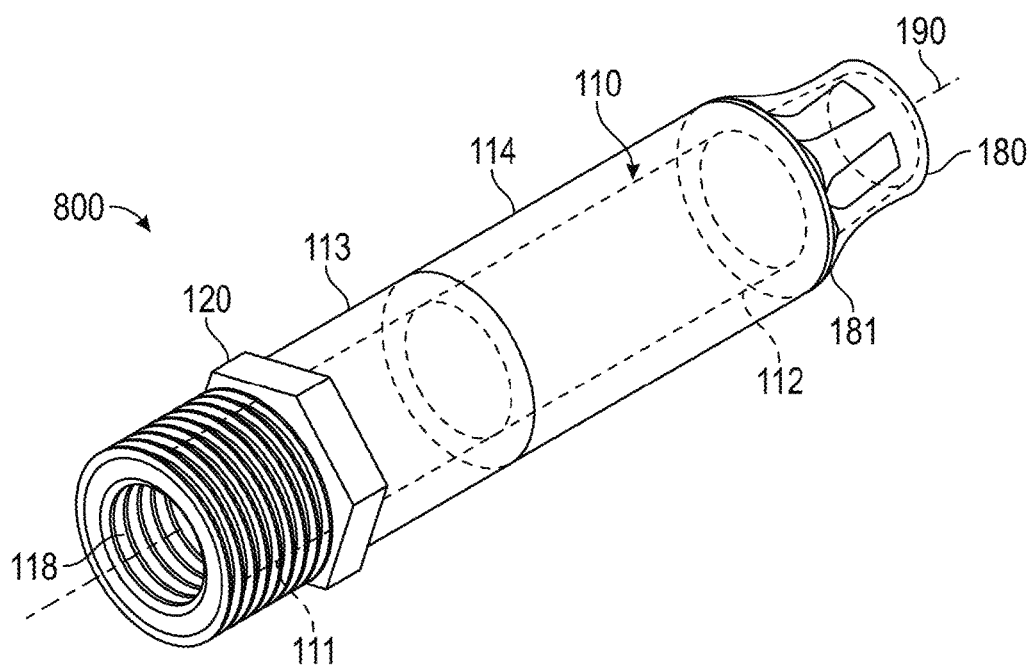
FIG. 8 is a perspective view of a pipe adapter according to another embodiment of the present invention.

Referring now additionally to FIG. 7, another embodiment of the pipe adapter 700 according to the present invention is now disclosed in greater detail. More specifically, and with reference to the distal end 112 of the inner tube member 110, the distal end 112 of the inner tube member 110 may be tapered. In addition, although not illustrated, the proximal end 111 of the inner tube member may be tapered.

The fitting member 130, or a portion thereof, may be tapered. The fitting member 130 may be expandable and rotating the fastener member 120 or the inner tube member 110 may cause the fitting member 130 and at least a portion of exterior walls thereof to expand outwardly from a longitudinal axis 190 of the inner tube member 110 and in a direction toward an inner surface 201 of the pipe 200.

Referring now additionally to FIGS. 8, 10, 13, and 14, another embodiment of the pipe adapter 800, 199 according to the present invention is now disclosed in greater detail. More specifically, and with reference to the first fitting member 180, the first fitting member 180 may be a barbed ring. The barbed ring may include a plurality of barbs which may be angled. When the pipe adapter 800, 199 is inserted into the pipe 200, the barbs may not engage or may partially engage the inner surface 201 until pressure or force is exerted in the opposite direction, at which point the barbs may engage the inner surface 201 of the pipe 200.

Figure 9:
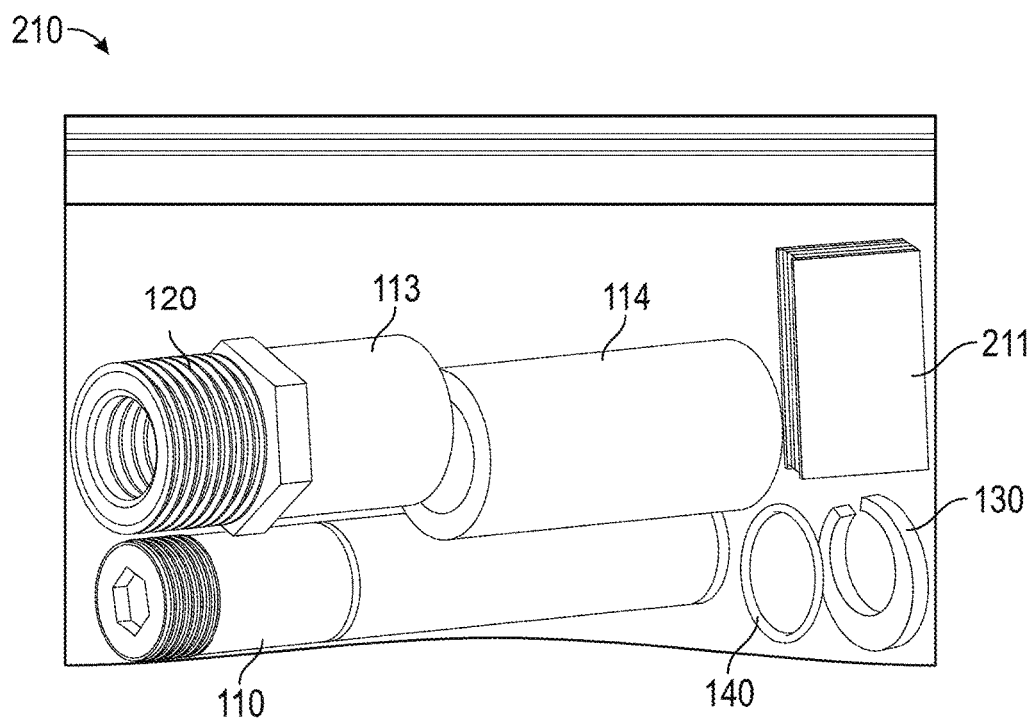
FIG. 9 is a perspective view of a kit for assembling a pipe adapter according to an embodiment of the present invention.

Referring now additionally to FIG. 9, another embodiment of the pipe adapter 100 according to the present invention is now disclosed in greater detail. More specifically, the pipe adapter 100 may be a kit 210. Those skilled in the art will appreciate that the kit 210 may include any of the components discussed herein or components as desired and may further include instructions 211. For example, and without limitation, and as illustrated, the kit 210 may include the inner tube member 110, the outer sleeve member 113, the compressible sleeve member 114, the fastener member 120, the fitting member 130, the O-ring 140, and the instructions 211.

All of the components of the kit 210 may be purchased in the kit 210. The kit 210 may come in a box, a bag, or other package(s). The instructions 211 may instruct a user in how to assemble the components into the pipe adapter 100 and/or how to use the pipe adapter 100. The kit 210 may further include tools required to install the pipe adapter 100 and other fittings, including, but not limited to, a hose bib, bibcock fitting, or other fitting as desired.

A method of installing the pipe adapter 100, 199 may include inserting at least a portion of the inner tube member 110, the outer sleeve member 113, the compressible sleeve member 114, the fastener member 120, and/or the fitting member 130 into a portion of the pipe 200. Rotating the fastener member 120 may cause the compressible sleeve member 114 to expand outwardly from the longitudinal axis 190 of the inner tube member 110 and in a direction generally toward an inner surface 201 of the pipe 200. The compressible sleeve member 114 may be capable of forming a seal with the inner surface 201 of the pipe 200.

The pipe 200, as described herein, is not meant to include only pipes. The pipe 200 is defined to include anything that can receive the pipe adapter 100, 199, including, but not limited to, pipes, valves, fittings, adapters, or any other object that has a substantially hollow inner surface.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A pipe adapter comprising:
    an inner tube member having a proximal section with a threaded portion and a distal section;
    a fastener member having threads on an inner diameter adapted to matingly engage the threaded portion of the inner tube member along the proximal section thereof;
    an outer sleeve member that girdles the inner tube member and is connected to and extends outwardly from the fastener member;
    a compressible sleeve member configured as at least one ring positioned to overlie the outer sleeve member; and
    a fitting member connected to the distal section of the inner tube member wherein the fitting member comprises a barbed ring;
    wherein at least a portion of at least one of the fitting member and the compressible sleeve member are positionable within a portion of a pipe; and
    wherein the compressible sleeve member extends outwardly from a longitudinal axis of the inner tube member and in a direction toward an inner surface of the pipe.

2. The pipe adapter according to claim 1 wherein the fastener member includes a polygonal shaped portion connected to the threaded end.

3. The pipe adapter according to claim 1 wherein the fitting member further comprises a swivel.

4. The pipe adapter according to claim 3 wherein rotating the fastener member causes the fitting member to matingly engage the outer sleeve member; and wherein barbs of the fitting member expand outwardly from the longitudinal axis and in a direction toward the inner surface of the pipe.

5. The pipe adapter according to claim 1 wherein the fitting member is connected to the distal section of the inner tube member.

6. The pipe adapter according to claim 1 wherein the inner tube member comprises a grooved section configured to matingly engage an o-ring.

7. The pipe adapter according to claim 1 wherein the compressible sleeve member is configured to create at least one of a liquid-tight and a gas-tight seal with the pipe.

8. The pipe adapter according to claim 1 wherein the distal section of the inner tube member comprises a grooved member configured to matingly engage the fitting member.

9. The pipe adapter according to claim 1 wherein the proximal section of the inner tube member comprises an opening that is at least one of polygonal, circular, and oval.

10. The pipe adapter according to claim 9 wherein the opening comprises a slot.

11. The pipe adapter according to claim 1 wherein the outer sleeve member comprises a recessed portion located between the fastener member and a distal end of the outer sleeve member, wherein the recessed portion is adapted to carry the compressible sleeve member.

12. The pipe adapter according to claim 1 wherein a distal end of the outer sleeve member is adapted to contact the fitting member.

13. A pipe adapter comprising:
an inner tube member having a proximal section with a threaded portion on an outer surface, a distal section and at least one grooved section located between the proximal section and the distal section;
a fastener member having threads on an inner diameter and opposing outer diameter, wherein the threads on the inner diameter are adapted to matingly engage the threaded portion on the outer surface of the inner tube member;
an outer sleeve member positioned to girdle the inner tube member, connected to the fastener member at a proximate edge and extending outwardly therefrom;
at least one o-ring carried by the at least one grooved section;
a fitting member connected to the distal section of the inner tube member wherein the fitting member comprises a barbed ring;
a compressible sleeve member comprising at least one compressible ring adapted to girdle the outer sleeve member;
wherein at least a portion of the fitting member is positionable within a portion of a pipe; and
wherein the compressible sleeve member extends outwardly from a longitudinal axis of the inner tube member and in a direction toward an inner surface of the pipe.

14. The pipe adapter according to claim 13 wherein the distal section of the inner tube member comprises a second grooved section configured to matingly engage the fitting member.

15. The pipe adapter according to claim 13 wherein the fitting member further comprises a swivel.

16. The pipe adapter according to claim 13 wherein the outer sleeve member comprises a recessed portion located between the fastener member and a distal end of the outer tube, wherein the recessed portion is adapted to carry the compressible sleeve member.

17. The pipe adapter according to claim 13 wherein the distal end of the outer sleeve member is tapered.

18. The pipe adapter according to claim 13 wherein a distal end of the outer sleeve member is adapted to contact the fitting member.

19. A pipe adapter comprising:
an inner tube member further comprising:
a threaded portion located on an outer surface of a proximal section,
a first grooved section located between the proximal section and a distal section, and
a second grooved section located on the distal section;
an outer sleeve member positioned to girdle the inner tube member, comprising:
a fastener member having threads on an inner diameter and opposing outer diameter, wherein the threads on the inner diameter are adapted to matingly engage the threaded portion on the outer surface of the inner tube member,
a tubular member having a tapered distal end, connected to the fastener member at a proximate edge and extending outwardly therefrom, and
a recessed portion located between the fastener member and the tapered distal end of the tubular member, wherein the recessed portion is adapted to carry a compressible sleeve;
at least one o-ring carried by the first grooved section;
a fitting member, comprising a barbed swivel ring fitting, carried by the second grooved section and adapted to contact the tapered distal end of the tubular member;
the compressible sleeve member comprising at least one compressible ring adapted to girdle the outer sleeve member;
wherein at least a portion of the fitting member is positionable within a portion of a pipe; and
wherein the compressible sleeve member extends outwardly from a longitudinal axis of the inner tube member and in a direction toward an inner surface of the pipe.

* * * * *